US006635387B2

(12) United States Patent  (10) Patent No.: US 6,635,387 B2
Fitter et al.  (45) Date of Patent: Oct. 21, 2003

(54) METHOD AND APPARATUS FOR ACHIEVING PROLONGED BATTERY LIFE

(75) Inventors: Johan C. Fitter, 51 Mount Street, Bryanston, Sandton, Gauteng Province (ZA); Robert T. Morris, Jr., 400 E. 77th St., New York, NY (US) 10021; Richard E. Belmont, Dubuque, IA (US); John T. C. Kan, Chicago, IL (US)

(73) Assignees: Johan C. Fitter (ZA); Robert T. Morris, Jr., New York, NY (US)

( * ) Notice: Subject to any disclaimer, the term of this patent is extended or adjusted under 35 U.S.C. 154(b) by 312 days.

(21) Appl. No.: 09/812,258

(22) Filed: Mar. 19, 2001

(65) Prior Publication Data

US 2002/0051912 A1 May 2, 2002

Related U.S. Application Data

(60) Provisional application No. 60/190,693, filed on Mar. 20, 2000.

(51) Int. Cl.[7] .............................................. H01M 6/04
(52) U.S. Cl. .......................... 429/347; 429/49; 429/50; 429/72; 429/80; 429/149
(58) Field of Search ........................ 429/347, 49, 52, 429/50, 73, 72, 80, 149, 248

(56) References Cited

U.S. PATENT DOCUMENTS

| 3,660,170 A | 5/1972 | Rampel | 136/154 |
|---|---|---|---|
| 3,877,993 A | 4/1975 | Davis | 136/107 |
| 3,928,066 A * | 12/1975 | Lewenstein | 429/347 |
| 3,945,849 A | 3/1976 | Hoffman | 136/107 |
| 3,953,242 A | 4/1976 | Hoffman | 136/155 |
| 4,064,324 A | 12/1977 | Eustace | 429/101 |
| 4,182,797 A | 1/1980 | Kondo et al. | 429/191 |
| 4,269,912 A * | 5/1981 | Rabenstein et al. | 429/225 |
| 4,359,071 A | 11/1982 | d'Arcy et al. | 141/1 |
| 4,477,539 A | 10/1984 | Struthers | 429/19 |
| 4,544,004 A | 10/1985 | Fitter et al. | 141/31 |
| 4,702,977 A | 10/1987 | Hiratsuka et al. | 429/194 |
| 5,660,947 A | 8/1997 | Wuehr | 429/192 |
| 5,747,546 A | 5/1998 | Sorenson et al. | 521/32 |

FOREIGN PATENT DOCUMENTS

BE   853255   10/1977

(List continued on next page.)

OTHER PUBLICATIONS

ZH Tohoku Denkihoan Kyokai, Automatic Dose Battery Liquid Replenish Device Detect Liquid Level Detect Installation Charge Pipe Information Pass Control Control Dose Rate Replenish Device, Sep. 27, 1996, Derwent Publications Ltd.

*Primary Examiner*—Patrick Ryan
*Assistant Examiner*—Thomas H. Parsons
(74) *Attorney, Agent, or Firm*—William J. Sapone; Coleman Sudol Sapone, P.C.

(57) ABSTRACT

A composition for prolonging battery life by reducing water loss and the degradation of properties due to dendritic precipitation, is refreshingly added to a battery electrolyte. By the refreshment of the composition, battery cycle life is substantially increased while degradation of the internal battery components is substantially reduced.

60 Claims, 8 Drawing Sheets

FOREIGN PATENT DOCUMENTS

| | | |
|---|---|---|
| DE | 1 163 413 | 2/1964 |
| DE | 2645106 | 1/1978 |
| DE | 27 26 579 A1 | 12/1978 |
| DE | 32 37 828 A1 | 4/1984 |
| DE | 37 02 137 A1 | 8/1988 |
| DE | 3702137 * | 8/1988 |
| EP | 0092604 * | 11/1982 |
| EP | 0 092 604 A1 | 11/1983 |
| EP | 0 409 363 A2 | 1/1991 |
| EP | 0 476 916 A1 | 3/1992 |
| EP | 0 756 346 A1 | 1/1997 |
| EP | 1 115 171 A1 | 7/2001 |
| FR | 522 360 | 7/1921 |
| FR | 2236283 | 1/1975 |
| GB | 1404355 | 8/1975 |
| JP | 50091728 | 7/1975 |
| JP | 520356725 | 3/1977 |
| JP | 05121089 | 5/1993 |
| JP | 8306365 | 11/1996 |
| JP | 10149839 | 6/1998 |
| JP | 11100347 | 4/1999 |
| WO | 9930379 | 6/1999 |

* cited by examiner

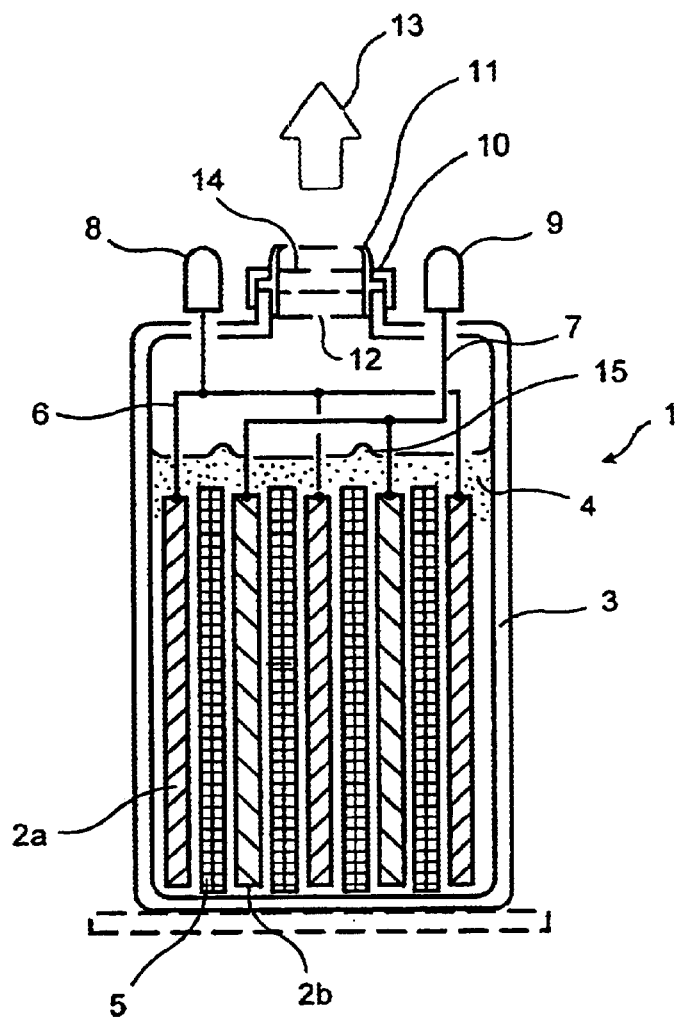
FIG. 1
PRIOR ART
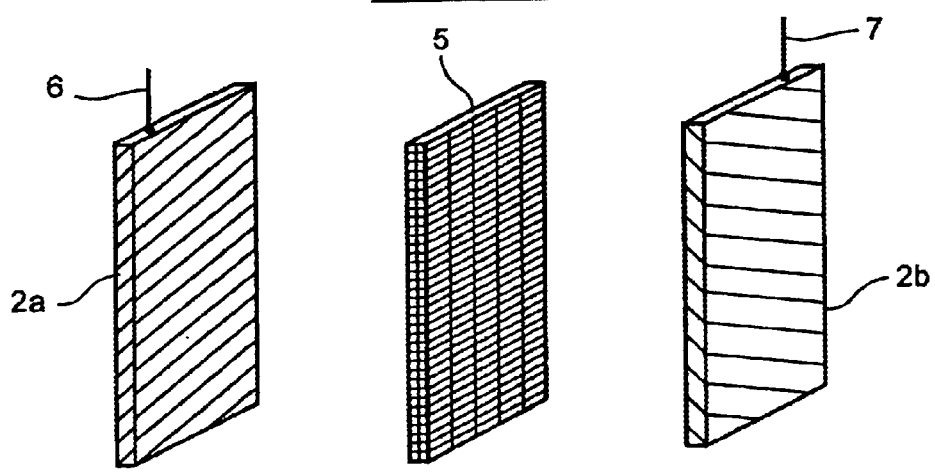
FIG. 2a
PRIOR ART
FIG. 2c
PRIOR ART
FIG. 2b
PRIOR ART

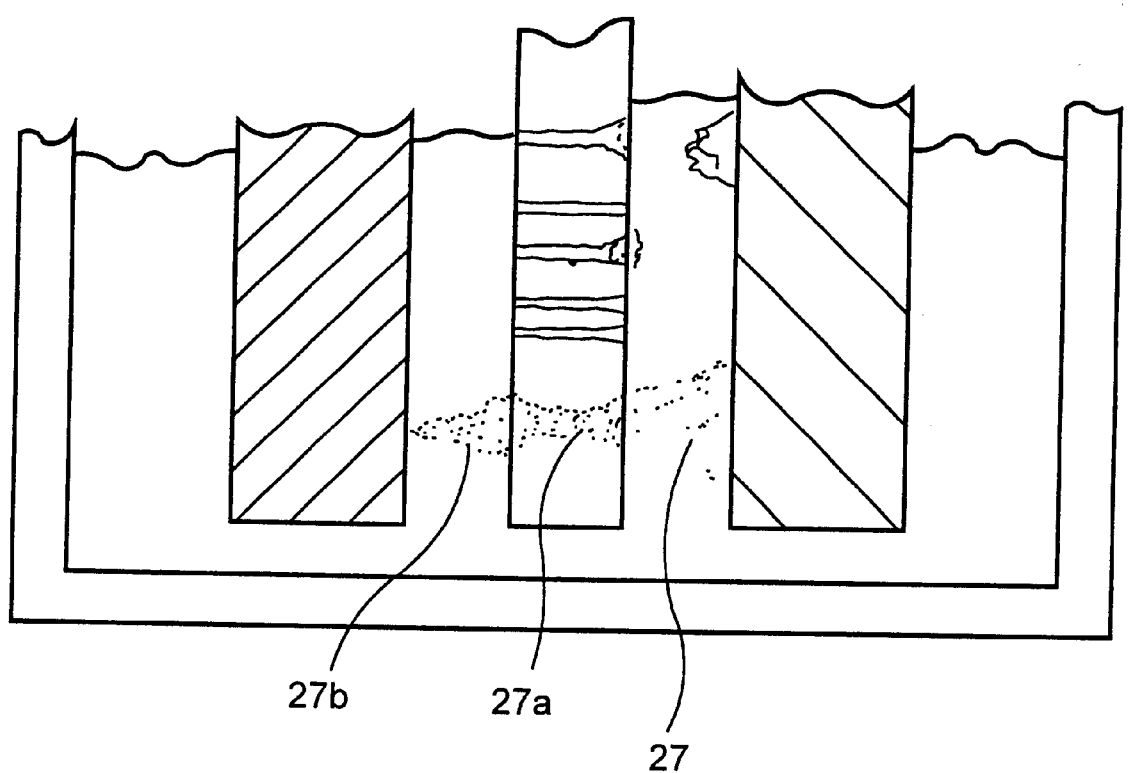
F I G. 4b

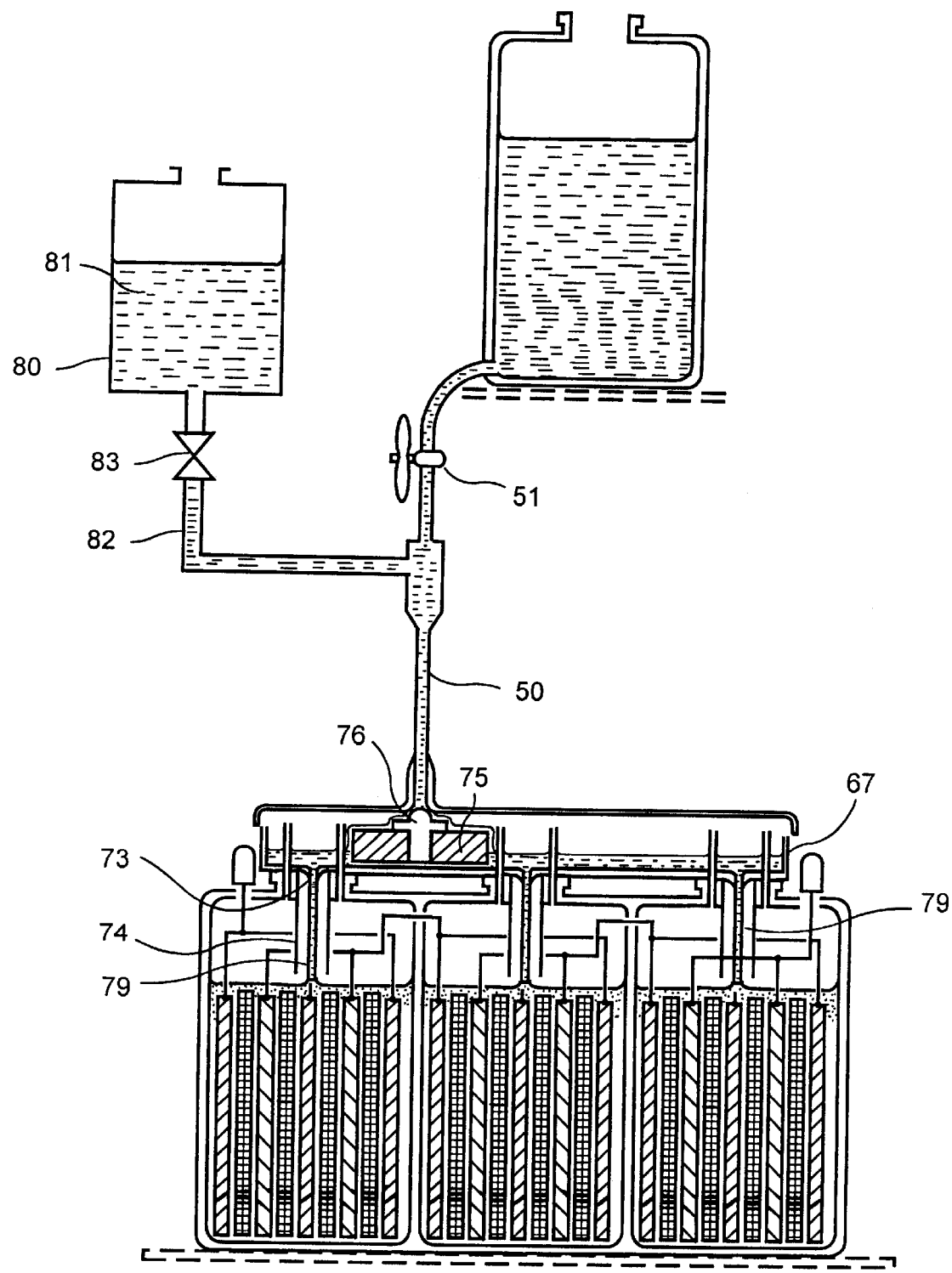
F I G. 6b

METHOD AND APPARATUS FOR ACHIEVING PROLONGED BATTERY LIFE

This application claims the benefit of Provisional Application No. 60/190,693, filed Mar. 20, 2000.

TECHNICAL FIELD

This invention relates to batteries and more particularly to a method and apparatus for increasing the useful life of a battery.

BACKGROUND

Conventional batteries for vehicles such as automobiles, golf carts, etc., are known. These generally comprise a casing containing multiple cells with anodes, cathodes, and separator plates immersed in an electrolyte. One example would be a lead acid battery having a pair of terminals, the anodes and cathodes being made of lead or a lead alloy and the electrolyte containing sulfuric acid.

Typically, such batteries have a limited useful life as cycling can result in the eventual loss of water from the electrolyte through electrolysis, releasing hydrogen gas, and/or deposition of impurities which eventually result in short circuiting within the battery.

Methods for increasing battery life have centered on programmed watering schemes, to make up for water loss. However, such schemes have no effect on the deposition of materials that can short the battery, nor are such methods available for use with sealed batteries which are commonly sold for automotive uses.

Another problem that leads to shortened battery life is corrosion of the battery components, particularly of the electrodes with corresponding penetration damage to the separation medium typically included between the electrodes in the battery. This separating medium is microporous, being in essence, a permeable membrane which may mate on the cathode side to a fiber mat material, with progressive penetration of this medium by conductive particles enhancing the likelihood that shorting will occur. The cathodes and anodes, while normally designed with a degree of corrosion resistance, will nevertheless suffer corrosion damage over the life of the battery, which can, of course, shorten battery life as well as cause release of the conductive particles that may eventually migrate to and penetrate the separator medium.

One method proposed for controlling gas emissions from a battery was proposed in U.S. Pat. No. 3,928,066 to Lewenstein, where quaternary ammonium compounds were included in a lead-acid battery with antimony grids to reduce the evolution of hydrogen gas from the anode electrode of the battery.

In French Patent No. 2,236,283 to Bonnaterre, quaternary ammonium compounds were included in nickel-iron and nickel-cadmium batteries to reduce the evolution of oxygen gas from the cathode electrode of the battery.

While securing a reduction in the evolution of gas under idealized testing conditions, the measures disclosed do not provide a long term solution to battery life.

Prevention of dissolution of a zinc anode is described in U.S. Pat. No. 3,953,242 to Hoffman, in which a primary cell has as the sole electrolyte a quaternary ammonium salt of limited solubility. A disadvantage of the limited solubility is an increase in the internal resistance of the cell.

Reduction in self-discharge is described in U.S. Pat. No. 4,064,324 to Eustace, in which an electrochemical cell contains a water soluble salt which is converted into an insoluble complex with cathodic halogen. While prolonging the shelf life of the cell, the discharge characteristics are impaired.

In U.S. Pat. No. 3,660,170 to Rampel, zinc dendritic precipitation is inhibited in alkaline zinc batteries by using a cationic high molecular weight organic polymer, preferably in the form of a hydroxide polymer, which promotes smooth and non-dendritic electro-deposition of the zinc metal onto the electrode, the polymer present at 0.1 to 10 percent by weight.

The use of the above described additives may have secured a short term performance increase, but this was found to diminish with time. To date, none of the above patented inventions have achieved commercial acceptance.

What is needed is a method and apparatus to provide a reduction in water disassociation/gas evolution, to prevent or reduce depositions which can result in cell shorting, and/or to reduce corrosion of the battery components.

SUMMARY OF THE INVENTION

It is an object of the present invention to provide a method and apparatus for increasing the useful life of a battery.

It is a further object to reduce water losses from a battery.

It is another object to reduce the detrimental effects on battery performance due to bridging precipitation of solids within a battery.

It is yet another object to provide a battery incorporating means for releasing a composition which increases the useful life of a battery.

It is a further object to provide an apparatus for progressively adding a battery life increasing composition to a battery over its useful life.

It is a further object of the present invention to reduce or eliminate corrosive damage to the battery components.

It is another object to provide a battery life extending additive for use in a battery.

It is another object to provide a composition and method for reducing self discharge and to thus substantially maintain the charge in a battery during storage.

These and other objects of the present invention are achieved by an apparatus for prolonging the useful life of a battery containing an electrolyte comprising:

a battery life extending composition; and, means for repetitively incorporating the battery life extending composition into the battery electrolyte during the battery's useful life.

A battery according to the invention comprises:

a housing containing an electrolyte, a plurality of anodes and cathodes disposed in the housing and connected serially and respectively to separate terminals, the battery having means for repetitively incorporating a battery life extending composition to the electrolyte so as to maintain an effective amount of the battery life extending composition in the electrolyte through the life of the battery.

A method for prolonging battery life comprises:

providing a battery containing an electrolyte therein, providing a battery life extending composition, and, repetitively incorporating the battery life extending composition in the electrolyte so as to maintain an effective amount of the battery life extending composition in the electrolyte for the life of the battery.

A method for reducing self discharge in a battery between cycles and/or to substantially maintain charge in the battery while in storage comprises:

providing a battery containing an electrolyte therein, providing a battery life extending composition, and, incorporating the battery life extending composition in the electrolyte in an effective amount for reducing self discharge and/or maintaining charge in the battery during storage.

A composition for prolonging battery life comprises an organic compound containing nitrogen and belongs to a functional group of amines. The compound more preferably is an organic amine with an n-alkyl chain and one exemplary compound is a cationic organic amine of the formula $R_aN^+$ where R is a straight, cyclic or branched hydrocarbon, and a is from 1 to 4, and optionally a carrier for encapsulating the amine, the carrier being slowly dissolvable in an electrolyte for gradual release of the amine contained therein.

Utilizing the present invention, defined quantities of a battery life extending composition are incorporated into the battery electrolyte over time so as to maintain an active concentration of the composition in the battery electrolyte. The purpose is to refresh the battery life extending composition, by repetitive addition, slow release or other means over the course of the battery's life, as the battery life extending composition is consumed. This composition is any agent which when incorporated into a battery electrolyte reduces electrolytic reduction of water and/or reduces deposition of solids and/or inhibits corrosion of the battery components. Such a composition may comprise, though is not limited to, various amines, preferably quaternary ammonium compounds. It has been found that, in essence, replenishing such a composition by, for example, using a carrier or package that releases the composition gradually, results in a reduction of water loss and has the surprising additional advantage of preventing dendritic precipitation in a battery that can cause bridging and short circuiting that reduce battery life. Further, corrosive damage and penetrative damage of the internal battery components, most notably the separating medium, has been nearly eliminated. Failure to replenish the composition over time results in a degradation of these beneficial effects and some form of repetitive/progressive addition over time must be effected to practice the invention.

BRIEF DESCRIPTION OF THE DRAWINGS

FIG. 1 shows a schematic sectional view of a first embodiment of the invention;

FIGS. 2a–2c show schematic perspective exploded views of the electrodes and separator element;

FIG. 4b showing a battery with particulate bridging;

FIGS. 6a and 6b show schematic sectional views of embodiments of the invention including a multi-celled battery and a battery watering arrangement;

DETAILED DESCRIPTION OF THE INVENTION

Figure 3:
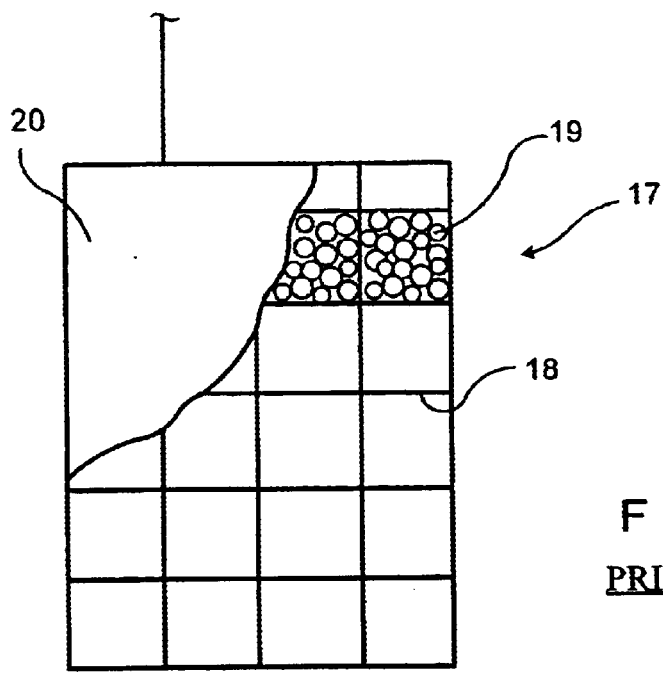
FIG. 3 is an enlarged sectional view of a grid electrode.

The invention involves the incorporation, progressively or periodically, of a battery life extending composition into a battery electrolyte during the life of the battery so as to maintain an active amount of the composition in the electrolyte. The object is to "refresh" the battery life extending composition as it is consumed. "Refresh" as that term is used in this application means to restore with a fresh supply. The invention refreshingly adds the battery life extending composition to the electrolyte to replace the amount consumed over time. A battery life extending composition is defined as any agent, solid or liquid, which when incorporated into a battery electrolyte, reduces electrolytic reduction of water and the corresponding gas evolution and/or reduces deposition of solids on the battery components and/or inhibits corrosion of the battery components. This composition may be a combination of specific compounds which each provide one or more of these desired features, and can additionally include a suitable carrier for providing a time release delivery of the agent to the electrolyte.

For ease in description, the battery life extending composition may be referred to herein additionally as an "economizer" or "agent", and such reference is not intended as a limitation on the compositions usable in the present invention.

The economizer preferably includes an organic compound containing an alkyl substituent. More preferable is an organic compound containing nitrogen which belongs to a functional group of amines. Exemplary compounds include but are not limited to organic compounds having an alkyl substituent of 2–22 carbon atoms, the organic amines, which tend to be cationic and preferably, organic amines with an n-alkyl chain. More preferable are compounds of the formula $R_aN^+$ where R may be aliphatic or aromatic and is preferably a straight, cyclic or or branched hydrocarbon, a being 1 to 4. While the number of carbon atoms may vary considerably, preferably R should include from 1–22 carbon atoms. While various and numerous amines could be used, the preferred compounds have a=4, specifically the quaternary ammonium compounds.

Quaternary ammonium compounds are usually tetra substituted ammonium salts that can have a large number of substituents. The alkyl radicals can be substituted or unsubstituted, saturated or unsaturated, aliphatic or aromatic, branched or normal chains. There may be a great variety of substituents on the R groups. In all cases, the nitrogen atom is pentavalent and is in the positively charged portion of the molecule.

The lowest molecular weight quaternary, i.e. methylene dimethyl ammonium chloride is very soluble in water and insoluble in non-polar solvents. As molecular weight increases, the solubility in polar solvents, including water, decreases and the solubility in non-polar solvents increases. This property is useful in selecting an active agent for time release as will be discussed further hereafter.

While the mechanism(s) of action may vary, compounds which act as surfactants that prevent deposition of metals or other impurities on the battery component surfaces by their surface active effects or chelating agents which sequester metal ions to prevent accumulation and/or agglomeration are likely to be particularly beneficial. Preventing this deposition can maintain relatively clean battery components, reducing electrolytic reduction of water and related gas generation, and preventing dendritic deposits from building up and penetrating the separating medium.

What appears to happen is that cations from the economizer are attracted to the negative electrode where they provide a non-conductive coating incorporating conductive metallic particles, the coating allowing good ionic current flow while inhibiting metal adherence, preventing a plating that would normally form the base for build-up of particulate. This leaves more metal ions in solution, approaching saturation that in turn inhibits/reduces the dissolution (corrosion) of the positive electrode. This coating is also likely to protect the separator to a certain extent. However, consumption of the economizer occurs and it is necessary to replenish the economizer or the beneficial effects will not be maintained.

These agents must be replenished and/or refreshed to secure prolonged battery life as they are consumed and/or neutralized with time, and this invention is directed to means, methods and compositions which accomplish the long term refreshment by the addition/maintenance of the agent in a way which is not primarily dependent on operator attention. The failure to appreciate and address this need is believed to have led to the failure of the prior art to achieve a long term solution to enhanced battery life.

It has been found that the agent is rapidly consumed in the electrolyte, probably at a rate related to the degree of battery use. In one instance, consumption averaged about 65 ppm per cycle, which is relatively rapid relative to the quantities which should be present in the electrolyte and/or replenishment liquid as will be described further below. This of course could vary widely from battery to battery, and from use to use, and the range could easily be from 1 to 200 ppm per cycle. It is believed that even after consumed, there is a period where protection continues without detrimental affects on battery life, allowing for the periodic addition of the agent, as opposed to maintenance of a continuous concentration of the agent in the electrolyte, but the time between additions may vary. For example, after addition of a dose of the agent to obtain an initial concentration of about 200 ppm, the agent could be consumed for example after about five cycles, yet the next addition may not be needed for another 20 cycles.

As a general guideline, more frequent addition with a lower agent concentration to maintain an effective or active amount of the agent in the electrolyte (an "effective or active amount" being one which has a beneficial effect for a time after consumption) is to be preferred over less frequent dosing at higher agent concentration. For example, it is preferred to dose the electrolyte at least once every 1 to 30 cycles. Ideally, one dose per cycle would be used, for example as part of an automated single point replenishment system, though of course this has to be tailored to the type of battery involved and the service use. The agent could be at a lower concentration in the replenishment liquid in the range of about 20–800 ppm, which dilutes further down when added to the electrolyte. Of course, using a time release type of addition, as will be discussed further below, one can provide a fairly progressive integration into the electrolyte at a rate which offsets the rate of consumption, in essence, to provide a continuous refreshment.

These agents must be present in the electrolyte within an active range for substantially the life of the battery. The active range extending from a lower end where at least minimal gas evolution/reduction effects are detected to an upper end where the beneficial effects are offset by a reduction in battery capacity. Generally, this varies with the choice of composition. An exemplary effective range is initially in the electrolyte at from about 1 to 5000 ppm, preferably about 10 to 1000 ppm and more preferably about 20 to 850 ppm. For certain quaternary ammonium compounds, by way of example, this range may be about 100 ppm to about 4000 ppm.

An unexpected benefit to use of the agent is a significant reduction in self discharge between cycles, and further when left idle for long periods. Back-up batteries or other batteries which are stored for long periods typically will loose their charge through self discharge and thus require frequent recharging. Dosing such batteries in the quantities described above with the agents according to the present invention not only prolongs battery life but allows the battery to stand idle between charges without significant loss of charge. For example, an automotive battery dosed with 2000 ppm of the composition according to the invention was stored for six months. A charger was then hooked to the battery and it took only 30 minutes to bring the battery to full state of charge as opposed to the normal requirement of about 36 hours, a substantial reduction in self discharge. Consequently, batteries treated in accordance with the applicants invention exhibit prolonged life, and maintain substantially their state of charge between cycles even if they stand open circuit for several years. This is a valuable and substantial advantage over existing batteries.

As one example, vehicles in storage would not need continuous "trickle" chargers to be attached to the batteries during storage or require a 24–36 hour delay in vehicle use while waiting for a battery to achieve a full state of charge. A significant number of batteries in remote locations or provided for emergency use or as back-up batteries could benefit from the present invention.

Among the compounds found to be useful in the practice of the invention are various water soluble compounds useful also as surfactants and/or disinfectants such as n-alkyl dimethyl benzyl ammonium chloride, didecyl-dimethylammonium chloride, N-alkyl dimethylbenzylammonium chloride, and didecyl-dimethylammonium chloride.

The economizer need not include a functional group according to the form $R_aN^+$, and may include one or more compounds which, severally or in combination, provide a similar function within the electrolyte. For example, it is possible to provide two components which combine or react within the electrolyte to liberate or form an economizer as defined above, which would fall within the scope of the invention. Both components need not be added to the electrolyte simultaneously i.e., one could be resident in the battery, the other added periodically to cause an economizer in an active concentration to be present within the electrolyte.

The economizer need not be totally soluble in water and/or the electrolyte, and indeed is preferably combined with a carrier such as a fatty acid, oil or wax which encapsulates and thus retards the dissolution of the economizer to produce a slow release into the electrolyte. Alternatively, the economizer can be placed in a permeable container disposed in the battery or be impregnated into the plastic used to produce the battery components or casing, and leach out of these or other structures over time to achieve the results of the invention. Of course, the economizer could be conveyed from a separate vessel for programmed addition to the electrolyte. However done, it is important to provide a convenient means for addition to avoid degradation of battery life through inattention.

One simple initial test that can be performed to screen for possible suitable battery life extending compositions is described here, though other tests may be used.

A small vessel is provided with an electrolyte and has a pair of electrodes placed in the electrolyte. These are preferably composed of a tin alloy for the positive electrode and a lead alloy for the negative electrode. For example, the positive electrode may be a tin:silver alloy(97%:3% by weight, respectively) or a tin:antimony alloy (95:5) and the negative electrode may be a lead:tin alloy (60:40 or 50:50). The most convenient source for test electrodes may be ordinary wire solder. A compound is selected and added to the electrolyte to provide a test concentration. For example, one may add N-alkyl dimethyl benzyl ammonium chloride to the electrolyte to achieve a 100 ppm concentration. The electrodes are connected to a power source in the range of 2.5 to 4.5 volts. There will likely be a significant amount of gas evolution initially.

In a control test without the compound, gas evolution should be higher during the total test period than in the test sample when the compound is present. For example, gas evolution over 2 to 4 hours is monitored, and if reduced, a suitable agent at an active concentration has been found. Further testing can be done at higher concentrations, possibly in 100 to 1000 ppm increments. At all concentrations, a metallic deposit may accumulate in the bottom of the vessel or deposit smoothly as opposed to tree-like on an electrode. Reduction in gas evolution and non-tree like deposition may be taken to indicate that a suitable agent in an active concentration has been found, though of course this should be confirmed by actual battery testing before being put into use.

To explain the full scope of the invention, it is necessary to review the invention in relation to a typical battery construction. The following describes a flooded electrolyte lead-acid battery. However, the principles of the present invention are applicable to other types of batteries and may, for example, be applied to a variety of alkaline batteries.

Referring to FIG. 1, a battery cell 1 has electrode elements 2 located in a battery enclosure 3 containing an electrolyte 4. The electrode elements 2 include a repeating arrangement of an anode electrode 2a, an electrode separating medium 5 and a cathode electrode 2b. These are immersed in the electrolyte 4 which in this example comprises approximately 75 percent water and 25 percent sulfuric acid at full state-of-charge of the battery, by volume.

The battery 1 contains multiple anode electrodes 2a electrically interconnected by a conductor 6 and contains multiple cathode electrodes 2b electrically interconnected by a conductor 7. The conductor 6 is electrically connected to a negative terminal 8, while the conductor 7 is electrically connected to a positive terminal 9.

A source of electrical energy or an electrical load upon the battery is typically connected to the negative terminal 8 and the positive terminal 9 (not shown).

The battery enclosure 3 has an optional access aperture 10 which receives a removable plug 11. This embodiment corresponds to various vehicle and industrial batteries, such as those used on golf carts. The aperture 10 may be used to add water to the battery 1 as well as allow an inspection of the electrolyte 4. The battery enclosure 3 may have an aperture that receives a permanent plug if a sealed battery, or receives a pressure relief valve, instead of, or in addition to, the aperture 10 and the plug 11.

The plug 11 incorporates a passage 12 to release any gases emanating from the battery 1, indicated by an arrow 13. The plug 11 has baffles 14 to define a serpentine path which allows the gases to escape while causing any entrained mist or spray to deposit on the baffles for return to the electrolyte 4. These constructions are conventional and various alternatives are known to those skilled in the art.

Applying electrical energy to the battery terminals causes chemical reactions within the battery electrolyte resulting in the battery becoming charged with electrical energy. Some of these chemical reactions cause gases such as hydrogen and oxygen to be evolved. Hydrogen typically forms on the anode electrode and oxygen typically forms on the cathode electrode. In time, these gases accumulate as gas bubbles 15 which rise to the surface of the electrolyte 4, and pass out of the battery enclosure 3 via the plug 11 and are thus lost from the battery 1. A loss of hydrogen and oxygen depletes the amount of water in the electrolyte.

This loss can usually be made up by adding replenishment water to the electrolyte, from time to time, via the access aperture. With sealed batteries, commonly used in automotive applications, the rate of water loss is reduced by selection of special electrode, separator and electrolyte materials, which may be used with gas recombination and special charging and discharging techniques. However, water loss cannot be eliminated entirely, and without replenishment, sealed batteries can generally be expected to have a shorter life than accessible flooded electrolyte batteries.

FIG. 2a shows an exploded view of a single anode electrode 2a, FIG. 2b a single cathode electrode 2b and FIG. 2c a single separating medium 5.

Either or both electrodes may be constructed almost entirely as a solid, homogeneous structure. However, either or both electrodes can have a grid-like or mesh-like metal framework, the voids in the frame filled with a particulate. FIG. 3a is an exaggerated illustrative view showing an electrode 17 having a metal framework 18 filled with an aggregated particulate 19. The particulate filling may be retained by a permeable enclosure 20 that is attached to and covers the framework. These constructions are conventional and known in the art.

The metal framework is usually made of an alloy of lead and antimony, or lead and calcium, antimony and calcium providing mechanical strength. The alloy may contain several percent of antimony, calcium alloying kept to a very low level, several orders of magnitude below that of antimony. Antimony imparts a degree of corrosion resistance particularly to the cathode electrode, calcium lowering hydrogen evolution from the anode electrode.

Most vehicle batteries have anode electrodes filled with a particulate having an active constituent that becomes lead metal when the battery is in a charged condition, and cathode electrodes filled with one having an active constituent that becomes lead-dioxide when the battery is in a charged condition.

The separator, located between anode/cathode pairs, must provide good electrical insulation and mechanical strength, while allowing unimpeded ionic conduction therethrough. The separator is non-conductive and provides a physical barrier to prevent particles from building up on the electrodes such that a bridge is created between them.

Figure 4A:
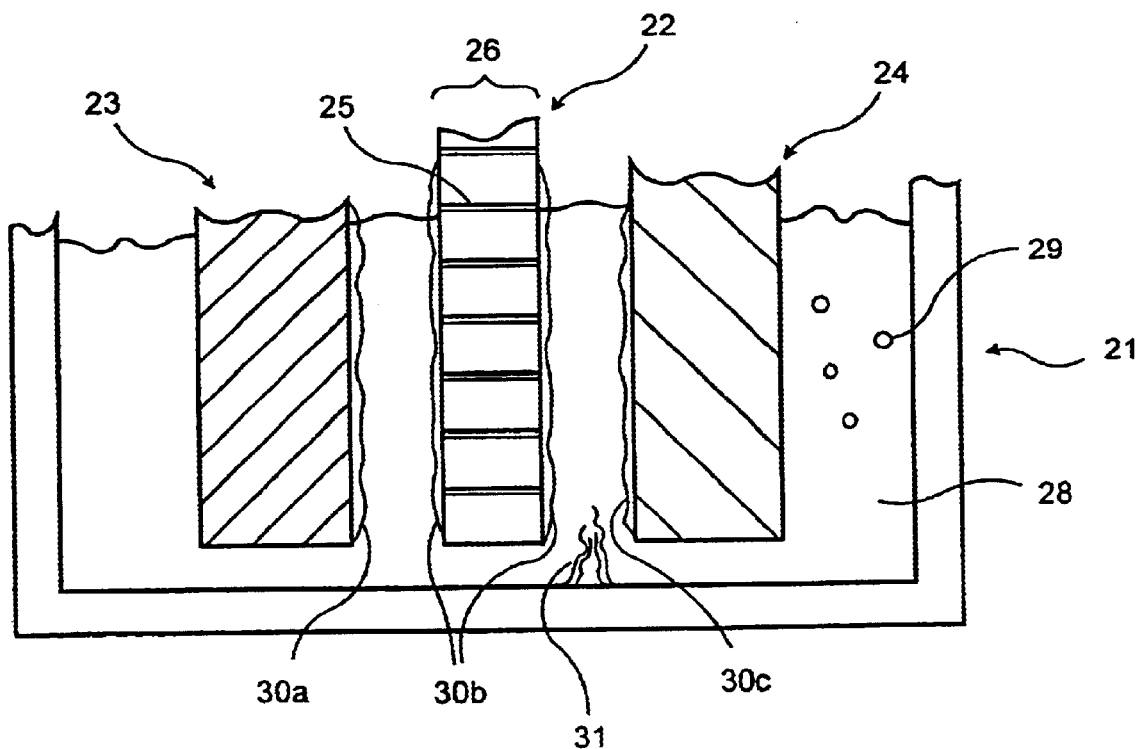
FIG. 4a shows a battery including an economizer.

Referring to FIG. 4a, a battery 21 has a separator 22 located between an anode 23 and a cathode 24. The separator is constructed of a material having pores 25 running across a thickness 26 of the separator 22. These pores are shown in exaggerated fashion for illustration, as they are actually micropores of very small diameter, being small enough to impede ingress of the very fine particulate yet large enough to allow ionic conduction therethrough.

One problem in prolonging battery life involves short circuiting caused by deposits that accumulate in the battery. These deposits are believed to involve the deposition of impurities on the electrode surfaces, with the build up extending to and eventually through the separator medium.

Lead used in the cathode or anode contains impurities, which if nobler than lead and deposited on an anode, increase hydrogen evolution. Alloying components such as antimony can dissolve and gradually deposit on the anode surface through normal operation, increasing hydrogen evolution, even if deposited in a comparatively minute quantity. Hydrogen evolution continues even after battery charging is completed.

FIG. 4b shows an agglomeration 27 of particles that extends to the separator, a portion 27a located in the separator pores. A similar build up 27b occurs on the opposing face of the separator, continuing to the opposing electrode until bridging occurs.

The deposition is not uniform but occurs in specific areas, leaving other areas free of deposition. This sets up tiny electrolytic cells between the base metal and the specific areas that have deposits which become focal points for hydrogen evolution. This is commonly referred to as local action, which promotes self-discharge of the battery. When this occurs, an extended charging procedure is needed to provide a full state-of-charge.

It is well known that electroplating deposition rates tend to be highest on projections and in areas of higher current density—the same applies to the formation of deposits on the battery electrodes.

The separator is intended to prevent the buildup from bridging the anode to the cathode and causing a short circuit. However, particles trapped in the pores do eventually cause penetration of the separator. These particles tend to swell, which significantly weakens the physical structure of the separator, allowing further particulate penetration. The rate of penetration is very slow, and can eventually cause the bridging shown in FIG. 4b. The rate of penetration is not equal across the entire separator, but is faster across a broad median stretching away roughly equidistantly from the points of attachment of the conductors on the adjacent anode and cathode electrodes, which corresponds to the path of highest overall current density between the conductors across the width of the separator.

The creation of these deposits involves a corresponding depletion or dissolution of metal particularly from the portion of the cathode electrode experiencing the median of highest current density.

The battery 21 of FIG. 4a has an electrolyte 28 which incorporates a dosage of an economizer 29 therein. As described above, the economizer is believed to inhibit the deposition of particulate or impurities on the electrode and separator surfaces, by coating these surfaces and/or capturing the particles before they can build up. Coatings 30a, 30b and 30c are representative of this. Deposits 31 that do form do not adhere and these surfaces remain substantially clean,

EXAMPLE I

Three 6 volt deep cycling lead-acid golf-cart batteries were prepared for deep cycling life testing, including electrolyte leveling. In example W, there was an addition of plain water to a marked level corresponding to the manufacturer's electrolyte reference level. A second example S received addition of a quantity of water including a dosage of n-alkyl dimethyl benzyl ammonium chloride sufficient to provide a total concentration in the electrolyte of the three battery cells of 50 parts per million of n-alkyl dimethyl benzyl ammonium chloride. A third example D received water having a dosage of n-alkyl dimethyl benzyl ammonium chloride sufficient to provide a total concentration in the electrolyte of the three battery cells of 200 parts per million, the concentrations being by weight.

After the W, S and D batteries were examined and found to be free of defects, they were placed on test according to Battery Council International Deep Cycling Battery Test Procedure(5/93). The tests were carried out at room temperature. A charging current of 30 A was applied to a voltage limit of 2.55 V per cell, and until 130 percent of the discharged capacity was returned. Discharge was at 75 A down to 1.75 V per cell. The batteries were rested for four hours before commencing the next cycle. The tests were conducted in conjunction with Bitrode LCN System Test Modules with precision programmable chargers and dischargers controlled by means of a personal computer through programs written for the proceedure. All data was saved on disk for analysis. The battery were type 105 golf cart Group GC 2 deep cycling motive power batteries, 3 cells, six volts.

Make-up for the batteries was prepared as follows: for battery W, plain battery water; for battery S, plain battery water plus a dosage of n-alkyl dimethyl benzyl ammonium chloride calculated to provide a concentration of 200 parts per million; for battery D, plain battery water plus a dosage of n-alkyl dimethyl benzyl ammonium chloride calculated to provide a concentration of 800 parts per million.

Make-up was added to batteries W, S and D on 15 consecutive occasions throughout the test at intervals dictated by the overall battery requirements, the replenishment procedures nevertheless being performed simultaneously on all three batteries W, S and D.

All three batteries were of identical type and manufacture: A-H rating W at start: 98.2 & A-H rating at 346 cycles: 166.2; A-H rating S at start: 100.2 & A-H rating at 346 cycles: 156.9; A-H rating D at start: 101.1 & A-H rating at 346 cycles: 153.6.

| MAKE-UP VOLUME IN MILLILITERS | | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| BATTERY W | 233 | 283 | 267 | 273 | 107 | 314 | 247 | 350 | 139 | 383 | 351 | 685 | 383 | 385 | 1001 |
| BATTERY S | 190 | 241 | 178 | 179 | 168 | 233 | 169 | 365 | 210 | 345 | 387 | 472 | 619 | 204 | 491 |
| BATTERY D | 233 | 249 | 136 | 137 | 120 | 200 | 186 | 247 | 29 | 210 | 357 | 359 | 382 | 182 | 391 |

TOTAL VOLUME BATTERY W: 5401
TOTAL VOLUME BATTERY S: 4451
TOTAL VOLUME BATTERY D: 3408 preventing the focal points from appearing on the electrodes, reducing gas evolution, and preventing penetration of the separator and bridging.

Battery W failed when it failed to deliver >80% of the starting A-H rating, after >400 cycles and after 15$^{th}$ make-up volume was added, at which time the test was stopped for batteries W, S and D.

Specifically, battery W completed 414 cycles and delivered 345 560 watt-hours, battery S completed 421 cycles and delivered 338 450 watt-hours, and battery D completed 422 cycles and delivered 334 295 watt-hours.

Duplicate testing on two additional sets of W, S and D batteries confirmed failure at 418 and at 384 cycles for the W batteries, with the two D batteries continuing to operate strongly beyond 500 cycles.

Impending failure of Battery W was indicated by the end-of-charge current readings obtained during the life testing procedure.

|  | CYCLE | AMPS | CYCLE | AMPS | CYCLE | AMPS | CYCLE | AMPS |
| --- | --- | --- | --- | --- | --- | --- | --- | --- |
| BATTERY W | 271 - | 2.0 | 346 - | 22.5 | 380 - | 30.0 = | equip. | max. |
| BATTERY S | 271 - | 1.3 | 346 - | 2.2 | 380 - | 5.9 | 405 - | 10.2 |
| BATTERY D | 271 - | 1.1 | 346 - | 1.4 | 380 - | 1.4 | 402 - | 5.3 |

After the life cycling test was discontinued, batteries W, S and D were discharged and disassembled for an inspection.

In battery W, manually prying apart the cathode and anode electrodes caused the separator membrane and fiber mat to split into their constituent mat and membrane elements. The fibrous mat further tore and left portions adhered to the cathodes, other portions thereof adhered to the membrane. It was also impossible to cleave the membrane from the anodes without tearing.

The membranes were held fast to the anodes at points which appeared to coincide with the electrode ribs, and in areas likely to have experienced the highest ionic current concentration. Metallic particles had penetrated the membrane and caused adherence to the anodes.

Grey granular metallic patches were visible on the side facing the cathodes. When tested for electrical conductivity by ohm-meter measurement, these possessed resistances in the lower kilo-ohm range to the anodes on the other side of the separators.

In contrast, in battery D, it was comparatively easy to cleave the anodes, separators and cathodes. These parts resembled their likely appearance at the time of their manufacture, except for some soiling.

In battery S, the splitting of the anodes, cathodes and separators indicated an adhesion characteristic estimated at half way between that of Battery W and Battery D.

In battery W, the fibrous mat appeared saturated with a two-shaded dark brown particulate that emanated from the cathode electrodes. In contrast, the fibrous mat of Battery D appeared to contain almost no particulate except against the face of the cathode electrodes. Again, Battery S showed particulate approximately mid-way between the other two.

In battery W, the cathodes had insufficient structural integrity to withstand the disassembly procedure. Cathode after cathode crumbled in areas likely to have experienced the highest ionic current concentration. Furthermore, the particulate cathode filling in this crumble zone was different from the particulate filling in the battery S and D cathodes, being more powdery and chocolate in color. The cathode grid members appeared corroded away, leaving the particulate filling electrically isolated, and perhaps unable to participate in the reactions normal to battery functioning.

In contrast, the cathodes of Battery D easily withstood the disassembly process. The cathode grid structure appeared like new, and the particulate filling was evidently properly retained. The filling color was a near-black grey-chocolate. Again, the cathodes in Battery S appeared to have characteristics half way between Battery W and Battery D.

Figure 5:
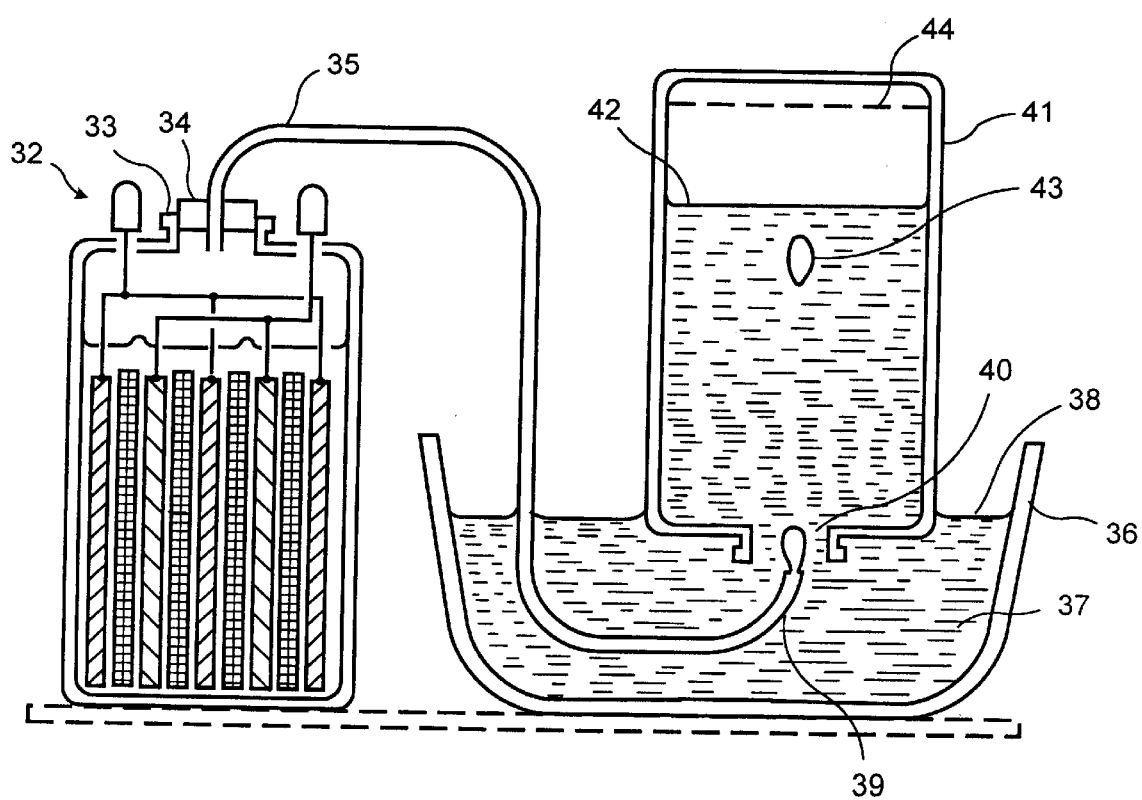
FIG. 5 shows a schematic sectional view of the first embodiment undergoing an evaluation of gas emission.

Gas evolution may be tested to show the effects of the present invention, referring to FIG. 5, battery water consumption is determined by measuring gas evolution by volume per unit time.

A battery 32 has an aperture 33 that contains a plug 34 that receives a tube 35 therein. The battery is otherwise substantially gas-tight. The tube 35 leads into a container 36 containing water 37 having a surface level 38. A delivery end 39 of the tube 35 is positioned underneath the water surface 38, beneath an opening 40 in a vessel 41 positioned in the container, the opening 40 being underneath the surface 38. The water in the container communicates with the water in the vessel through the opening 40. A water surface level 42 is provided within the vessel 41.

Gas evolving in the battery is transported through the tube, into the vessel, shown as a bubble 43, where it displaces an equal volume of water from the vessel. By recording an initial surface level in the vessel, represented by phantom line 44, at an initial time, and then measuring the change in displacement of the water level with time, (i.e. level 42 vs. level 44 ) the rate and volume of gas evolution can be determined.

As an example, the vessel can be graduated and have a volume sufficient to accommodate one to two liters, although the dimensions can be tailored to accommodate a greater or smaller volume.

Batteries experience a significant rate of water loss caused almost exclusively by electrolysis. After initial internal absorption of some of the gasses that evolve, the rate of gas evolution reflects the rate of water loss. For comparison testing on the results of the invention, batteries of equivalent type and electrical rating, as well as being operated in matching service, should be used.

Various direct analytical methods can be used to monitor the concentration of the active agents of the invention. In fact, the concentration of the additive in the replenishment water as well as in the battery electrolyte itself can be monitored comparatively easily using a variety of analytical instruments, such as a spectrophotometer of the type used to screen water. Quaternary ammonium compounds, as well as other organic compounds that may be active agents, are not difficult to detect even well below 5 ppm, using inexpensive portable analytical units not much larger than a laptop computer. This can be done by withdrawing a fairly small sample of electrolyte adequate for analysis yet insufficient to detrimentally affect battery operation.

Figure 6A:
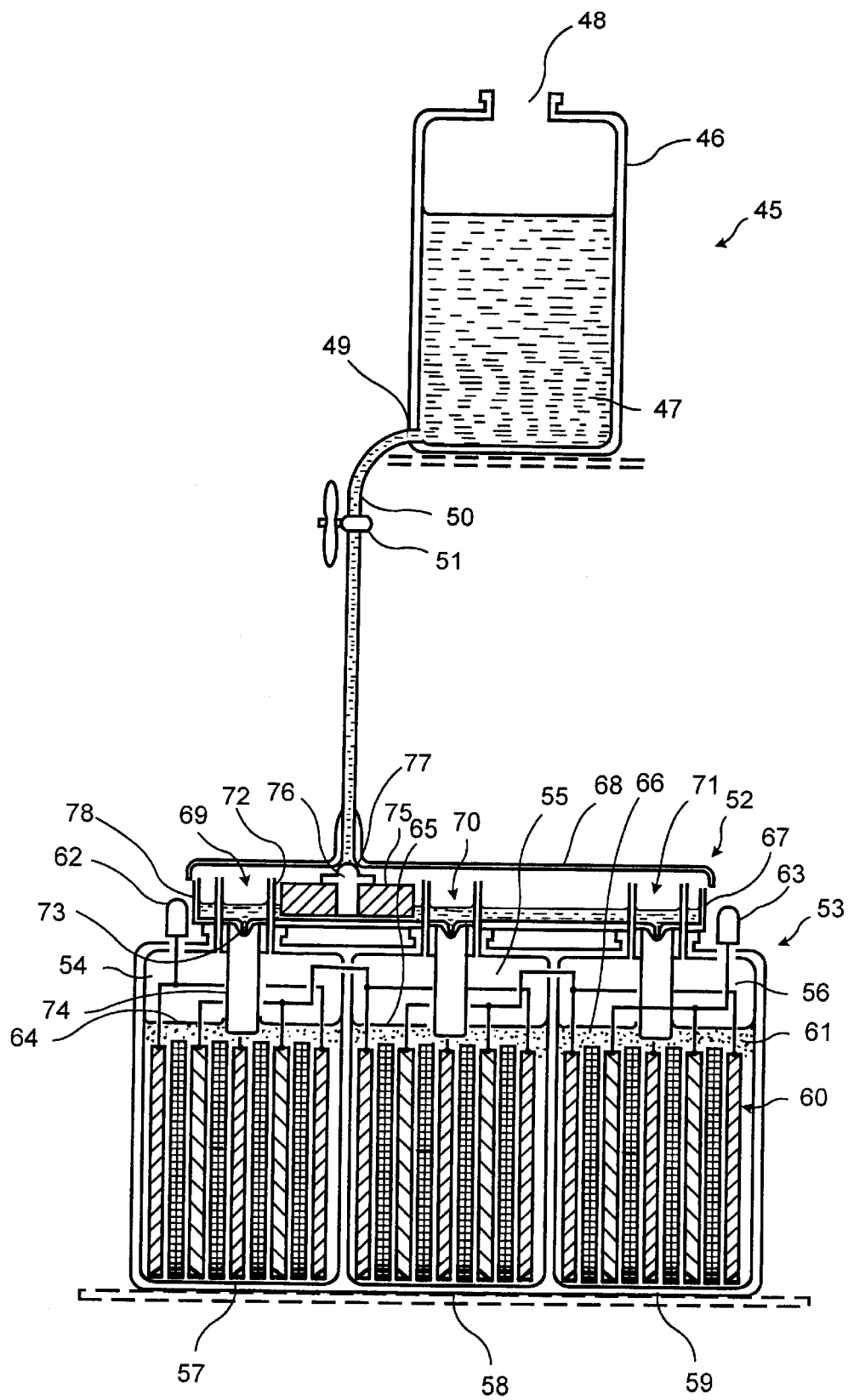

One apparatus and method for practicing the present invention is directed to treating one or more batteries arranged to operate in conjunction with each other. Referring to FIGS. 6a and 6b, a battery watering arrangement 45 has a water reservoir 46 arranged to hold a suitable quantity of replenishment liquid 47. The liquid 47 has a dosage of the economizer sufficient to provide an active concentration in a battery when added to an electrolyte.

The reservoir 46 has an access aperture 48 and an outlet 49 feeding a supply pipe 50 which incorporates a valve 51. The supply pipe leads to a filling device 52 placed on a battery 53.

The battery 53 is a unitary three-cell, six-volt golf-cart battery having a first cell 54, a second cell 55 and a third cell 56, the first, second and third battery cells each respectively including sub-enclosures 57, 58 and 59, respectively. Each battery cell has a set of electrode elements 60 enveloped by an electrolyte 61. The three cells are connected electrically in series by interconnections and the sum of the electrical potentials of the three cells are connected to a negative terminal 62 and a positive terminal 63.

In FIG. 6a, the electrolyte in the first cell has a level 64, the second cell has a level 65 and the third cell has a level 66. These levels are not necessarily coincident prior to replenishment.

The filling device 52 has a trough 67, a lid 68 and three sub-fillers 69, 70 and 71, respectively. Each sub-filler includes two breather pipes 72, an orifice 73, and a level sensing pipe 74. The trough 67 houses a float 75 and an associated valve 76, which nests into a valve seat 77 incorporated into the lid 68.

The breather pipes 72 facilitate escape of any evolving gases from the three cells, the gases flowing into the interior of the filler device 52, and then escaping via slots 78 between the trough 67 and the lid 68.

The levels of the electrolyte in the three cells are shown as low in FIG. 6b, the cells receiving replenishment as will now be described.

The valve 51 is open, and liquid flows via the supply pipe 50 past the valve 76, across the float 75, into and partially filling the trough 67. As the electrolyte level is below a bottom of the level sensing pipes, an air block in the sensing pipe is relieved and the liquid passes through the three orifices 73 so that the liquid drops into the three cells as streams 79, causing the three levels to rise progressively, until the levels reach the bottoms of the liquid sensing pipes, reforming the air blocks and halting flow into the cells, as shown in FIG. 6a.

When the liquid covers the level sensing pipes, the pressure within the sensing pipes rises progressively, and the flow rate of the three streams begins to reduce progressively until a pressure is achieved which causes the flow to cease, thereby causing liquid to accumulate raising the float which presses the valve against the valve seat to stop the flow into the trough.

The valve 51 is usually not kept open, as it takes no more than about ten minutes to complete replenishment. In fact, there is usually a quick disconnect that allows the pipe to be disconnected from the filling device after filling, so the battery can be used elsewhere, and then returned and reconnected at the next scheduled replenishment. The filler unit is preferably left installed on the battery.

Any evolving mist or spray that passes through the breather pipes 72 substantially condenses on the inner surfaces of the trough 67 and the lid 68, and is returned to the cells via the orifices 73. Thus, water saving due to use of the economizer is combined with savings through condensate return to produce a significant reduction in water loss.

The replenishment liquid can be prepare as follows. Assuming a desired concentration of 800 parts per million of the economizer, the reservoir should be filled about half way with water via the access aperture. About 80 milliliters of a ten percent solution of the economizer per liter of total water to be used in the reservoir is added, and then the balance of the water is added. This provides reasonably adequate mixing with minimal foaming.

The specific gravities of water and the economizer are typically virtually identical, and therefore mixing by volume—which is generally more convenient at a battery operating site—is adequate.

The replenishment liquid replaces a substantially equivalent volume of water lost from the electrolyte through normal usage. The system is self-regulating as the degree of water loss is an indication of the activity of the economizer, such that should activity diminish, water loss increases, leading to addition of more economizer. Of course, with activity maintained, less replenishment, and thus less economizer need be added to the battery. Thus, the electrolyte is refreshed by periodically accepting a dosage of the liquid in proportion to its need not only of water but of the active concentration of the economizer. Such a system is simple to implement and much more human error tolerant than the systems of the prior art, yet provides a significant increase in battery life and performance.

The preferred economizers are suitable for use in batteries, not only for prolonging battery life, but also have an additional benefit of acting as a sanitizer for controlling growth of algae, fungi and bacteria in the liquid distribution network associated with the replenishment arrangement. If this additional benefit is desired, a minimum concentration of about 50 parts per million should be used, the concentration of 800 parts per million described above being an example that achieves both objectives, a suitable range for controlling organism growth being about 50 to about 800 ppm.

The economizer can be incorporated into the replenishment liquid in other ways. Referring to FIG. 6b, a second reservoir 80 is provided which contains an economizer 81. The reservoir has a supply pipe 82 and a valve 83, the supply pipe teed into the supply pipe 50, so that both fluids are combined in line during transport to the filling device. Fluid delivery can be by gravity, by siphon, by pressurizing the reservoir(s) using air or nitrogen, or be driven using a pumping device. The valves can be control valves to provide controlled proportions of the liquids. In any event, this allows more precise tailoring of the amount of economizer to be fed as well as allowing a different frequency for economizer replenishment versus water replenishment i.e., every cycle water, every other cycle water plus economizer. Thus, there is substantial flexibility relating to integration and refreshment of the economizer in the electrolyte on a periodic basis so as to assure an active concentration of the economizer in the electrolyte over time.

A suitable proportion of the economizer may be administered to one or more of the cells directly, either via an access aperture such as the access aperture, or may be incorporated into the battery in a form substantially unreactive, becoming reactive during the course of operation of the battery thereafter, or be incorporated for migration from various structures as will now be described. The economizer may be administered as a solid, liquid or gas, severally or in combination. It may be included in an encapsulation or a chemical form that is initially unresponsive to the electrolyte.

Figure 7:
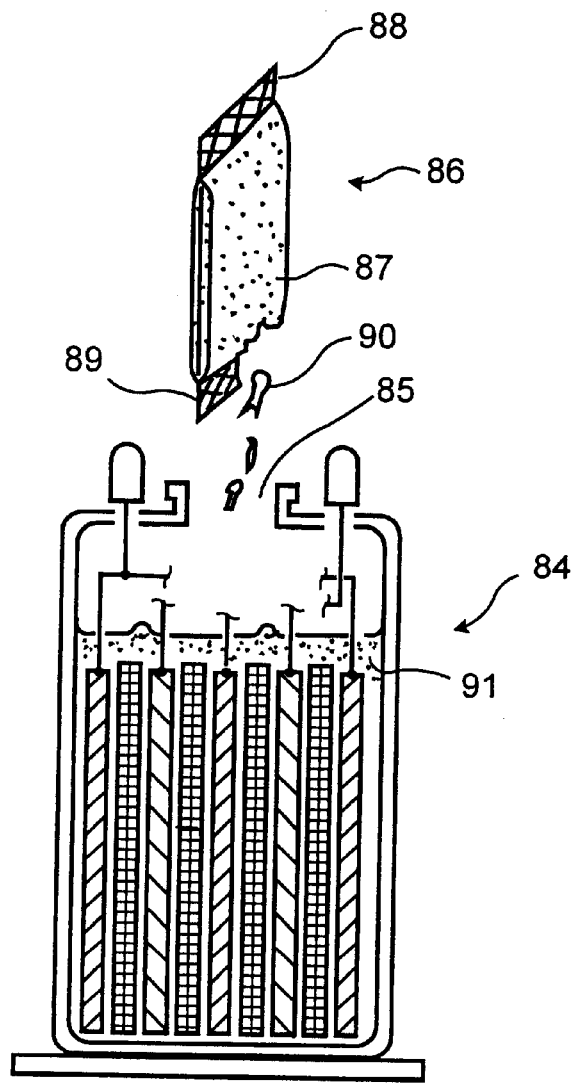
FIG. 7 shows a part sectional view of another embodiment of the invention using a sachet.

Referring to FIG. 7, a battery 84 has an access aperture 85, with its closure plug removed. A sachet 86 having a flattened tubular portion 87 and end closure seals 88 and 89 contains a prescribed quantity of an economizer 90. The sachet may be prepared in a packaging process akin to a packaging process for unit dose packages. Such sachets are commonly used for items such as ketchup, mayonnaise, etc. The flattened tubular section is typically, although not exclusively, made of polyethylene film, and may include a metalized film. The closure seals at the ends and may be applied by a heat sealing process.

The unit dosage of the economizer may be released by perforating the tubular portion by a knife, scissors, or any other suitable implement. The unit dose then enters the battery 84 and contacts an electrolyte 91.

Unit dosing on a periodic basis may be appropriate for use by the average consumer who has only one or two batteries to maintain, avoiding the need for a replenishment apparatus. It is comparatively easy to apply the economizer in a dose form without having to estimate how much to apply. Further, a check off label can be placed on the battery to date the addition so that a subsequent unit dose can be added at the frequency required to refresh and maintain an active concentration, such as every three to six months for an automotive battery.

As an alternative, the sachet can contain a liquid permeable pouch that can fit through the aperture and reside in the battery enclosure. Electrolyte contacting the pouch causes gradual dissolution of the economizer into the battery. This is facilitated by the easily deformable polyethylene film tube construction.

The sachet may have a retrieval means including a length of string, not shown, similar to the string attached to some tea bags common to every day use. As such the distal end of the string would be retained external to the container via the access aperture, and retrieval may be performed at any time when convenient.

The sachet may be breached by suitable means prior to being applied to the container, and may also include a suitable construction of the flattened tubular section which, by its nature, facilitates retention of the dosage of the economizer under storage conditions, but facilitates a release of the dosage of the economizer upon contact of the flattened tubular section with the electrolyte.

This is typically achieved by rendering the polyethylene film susceptible to corrosive, infusive or other effects of the electrolyte on the body of the sachet, for facilitating progressive release of the unit dose of the economizer when in contact with the electrolyte.

Figure 8:
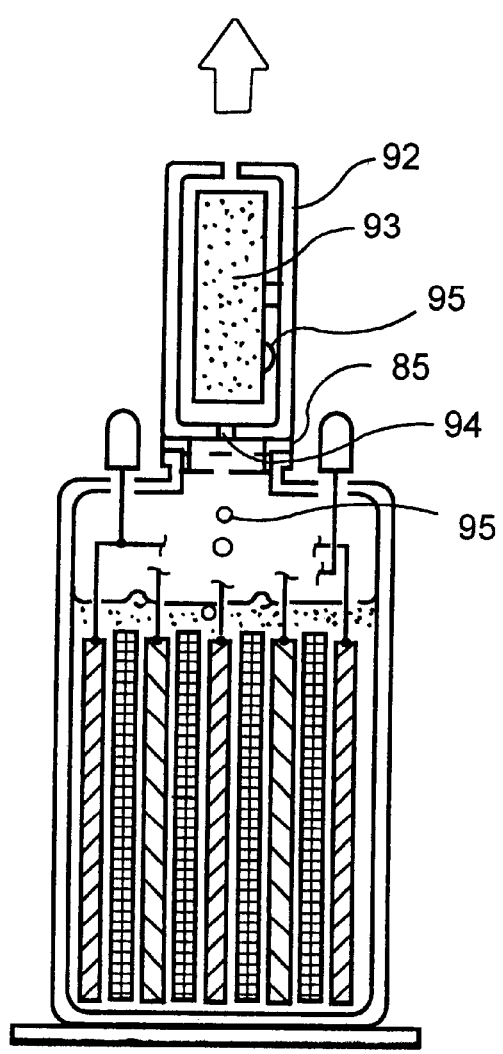
FIG. 8 shows a sectional view of an embodiment of the invention using an applicator.

Referring to FIG. 8, an alternative embodiment is shown where the access aperture 85 is fitted with at least one applicator 92 in place of a closure plug.

The applicator 92 contains an economizer 93, the applicator having an opening 94 for ingress of acid mist or spray entrained with any gaseous effluent. The acid mist or spray deposits on the economizer.

Accumulation of the deposited acid mist or spray provides droplets 95 on the economizer causing dissolution or diffusion so that the economizer may be added to the electrolyte when the condensed droplets 95 return to the battery. Ideally, the rate of release of the economizer is progressive and related to the degree of water loss so as to provide a dose response proportional to the likely need. In other words, the rate of release of the economizer will be higher when the process of gassing is severe, and will be lower when the process of gassing is moderate. The release will approach zero when the battery remains idle. This variability is desirable as it provides a greater quantity of the economizer when required, and a lesser quantity when it is appropriate—constituting a form of feedback control over the rate of application of the economizer.

While the economizer may be applied in a way such that it enters the electrolyte at an upper level within the battery, mixing and migration occur by diffusion and agitation of the electrolyte as a result of gassing during charging.

Figure 9A:
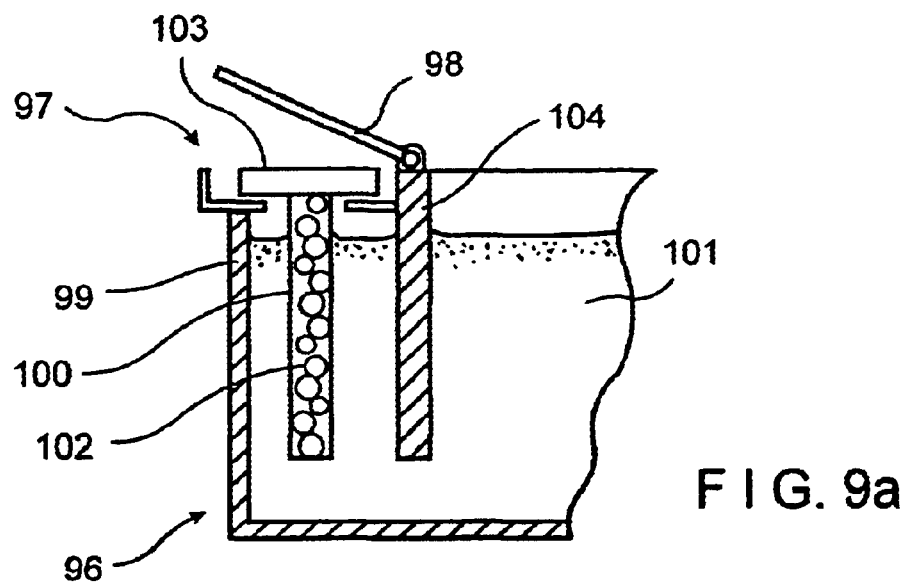
FIGS. 9a–c show partial sectional views illustrating additional embodiments of the invention.

Referring to FIG. 9a, a partial view of a battery case 96 is shown, with the battery components removed for ease in illustration. The battery case 96 has an opening 97 and a mating lid 98, with a ledge 99 for receiving at least one economizer dosage applicator 100 which is placed in and generally enveloped by an electrolyte 101. The applicator 100 contains an economizer 102, which can be in the form of a sachet, as described previously, having a flattened tubular portion with closure seals, or, as shown, receive a dosage of the economizer poured for example, directly from a storage container. The applicator has a handle 103 to ease placement in the battery, which can also act as a cap that can lift up for filling the applicator with the economizer.

Preferably, the applicator is segregated from the cell area of the battery by a baffle 104 which reduces the dispensation of the economizer due to physical agitation, so as to promote a more controlled and steady dissolution primarily by chemical action. The baffle is intended to prevent instantaneous dissemination of the economizer into the electrolyte. Ideally, the rate of dissemination of the economizer into the electrolyte approximates an equivalent averaged rate similar to that described above relative to the replenishment water system discussed above.

The applicator shown is removable so that a simple exchange after a period suitable to the battery is carried out to maintain the active concentration of the economizer. Alternatively, the applicator can be retained in the battery and refilled periodically, either by removing and replacing a sachet or by direct addition. As the dissolution involves chemical activity, the applicator should be permeable. For example, where a sachet is used, a cage structure may be suitable, whereas with direct addition, a permeable membrane, or perforated tube that allows liquid to flow through to the economizer can be used.

The applicator is not limited to a position as indicated in FIG. 9a, but may be varied, as convenient, provided the electrolyte has access to effect a release of the economizer. The shape and form of the applicator is also not limited to that shown, but may include a wide variety of suitable constructions that prevent instantaneous dissemination and provide a requisite dissolution rate equivalent to the averaged rate that would have been added via the replenishment water system described above. While one applicator is shown, any suitable number of units may be dispersed about the battery.

Figure 9B:
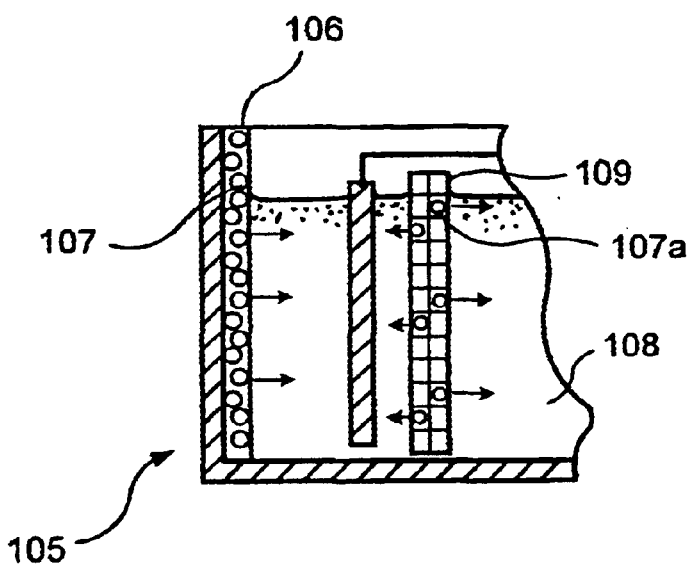

Another alternative is to incorporate the economizer directly into the battery when constructed. Referring to FIG. 9b, a battery 105 has a wall 106 impregnated with an economizer 107. The wall is composed of a material such as plastic which is sufficiently permeable to allow migration and leaching out of the economizer into an electrolyte 108 slowly over time to assure an active concentration over the life of the battery. Incorporation of compounds into plastic by capture in an interpenetrating polymer network or by blending prior to polymerization or molding are techniques known in the art. There is sufficient surface area within a battery to contain an amount of economizer sufficient to assure that the active concentration is maintained to achieve prolonged battery life. In addition, not only the housing components, but preferably a separator 109 can be produced that incorporates an economizer 107a for slow release to allow localized migration to especially protect the separator from dendritic precipitation as well as for release into the electrolyte. Such a construction may slightly increase the cost of battery or separator construction, but does increase convenience for the person who prefers a low to no maintenance battery, as the battery life extending composition can be automatically refreshed for a period of years.

Figure 9C:
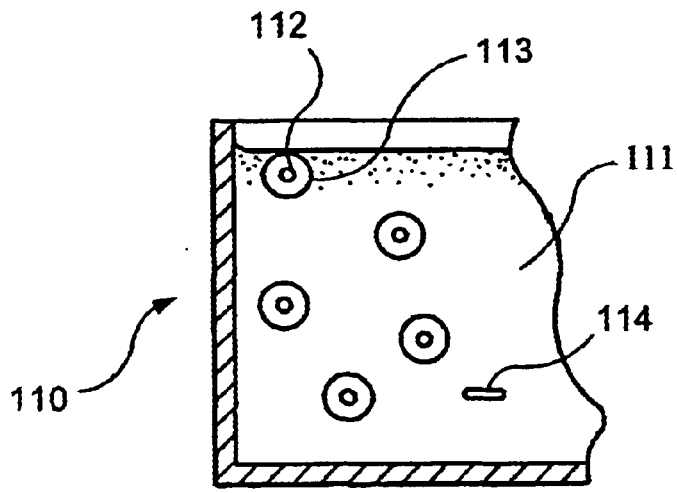

The economizer itself can be formulated or encapsulated to provide slow release over time. Referring to FIG. 9c, a battery 110 has an electrolyte 111 containing an economizer 112 that is encapsulated by a coating 113 for slow release into the electrolyte. Enteric coatings are known for resisting dissolution in acid, and a similar scheme can be used to treat the economizer for use in each of the diverse means for adding the economizer to a battery electrolyte described above.

The economizer may itself be largely insoluble, the insolubility providing a barrier against the electrolyte, remaining insoluble for a desirable period, and thereafter becoming sparingly soluble in the electrolyte. While physically surrounded by the electrolyte, the economizer does not make substantial reactive contact with the electrolyte for at least an initial period.

The economizer may be formulated into a mixture of substances that may include a portion that is insoluble and a portion that is soluble, the insoluble portion delaying release of the economizer into the electrolyte over time. Further, the economizer can be formulated and physically treated to provide a time release in the electrolyte. For example, if a solid, the economizer can be compacted into a pellet form, shown in FIG. 9c as 114, the limited surface area of the pellet limiting the release of the economizer into the electrolyte. Such pellets could be loaded into the battery directly or into the various applicators described above.

The economizer can be mixed with oils or waxes which resist degradation by electrolyte, to provide a slow release characteristic. For example, formulating with $C_{20}$ to $C_{34}$ waxes or $C_{35}$ and higher solids, can provide a low cost time release formula as these hydrocarbon compounds are resistive to degradation by battery acid, eventually releasing the economizer into solution. Effervescent or foaming agents can be included to promote release as the compound dissolves. Of course, numerous materials can be formulated with the economizer and the invention is not limited to those described.

The economizer is not limited to solids and liquids but can be in a readily soluble dispersable foam. For example, in submarine batteries among others, there is a provision for air injection to agitate and circulate the electrolyte, and a foamable economizer can be blended into the air for dispersion into the electrolyte. Of course, this can also be a vehicle for liquid dispersion using the air to deliver the economizer uniformly throughout the battery.

While preferred embodiments of the present invention have been shown and described, it will be under stood by those skilled in the art that various changes or modifications can be made without varying from the scope of the present invention.

We claim:

1. An apparatus for prolonging the useful life of a battery containing an electrolyte comprising:
    a battery life extending composition; and
    means for refreshingly incorporating the battery life extending composition into the electrolyte in an effective amount to substantially maintain an active concentration of the battery life extending composition in the electrolyte, the means for refreshingly incorporating the battery life extending composition being a reservoir, connectable to the battery, the reservoir having a and valve means for periodically adding the battery life extending composition and replenishment water to the electrolyte.

2. The apparatus of claim 1 wherein the battery life extending composition is an organic compound containing an alkyl substituent.

3. The apparatus of claim 1 wherein the battery life extending composition is an organic compound containing nitrogen.

4. The apparatus of claim 1 wherein the means for refreshingly incorporating the battery life extending composition further comprises an applicator locatable with the battery and positioned for releasing the battery life extending composition into the electrolyte.

5. The apparatus of claim 1 wherein the means for refreshingly incorporating the battery life extending composition further comprises an applicator, the battery further comprising an access aperture, the applicator disposed in the access aperture.

6. The apparatus of claim 1 wherein the means for refreshingly incorporating the battery life extending composition further comprises an applicator, the battery having an opening for receiving the applicator, the applicator having a portion submerged in the electrolyte.

7. The apparatus of claim 1 wherein the means for refreshingly incorporating the battery life extending the composition further comprises an applicator contactable with the electrolyte, the applicator including at least one container for accommodating the battery life extending composition, the applicator being penetrable by the battery life extending composition for integrating the battery life extending composition with the electrolyte.

8. The apparatus of claim 1 further comprising a filling device locatable on the battery, the battery having at least one access aperture for receiving the filling device, the filling device connectable to the reservoir for receiving the battery life extending composition and replenishment water, the filling device having means for automatically adding the battery life extending composition and replenishment water to the electrolyte and for automatically stopping the addition when a selected level has been reached.

9. The apparatus of claim 1 wherein the means for refreshingly incorporating the battery life extending composition further comprises a unit dose container that is penetrable for release of the battery life extending composition therefrom.

10. The apparatus of claim 1 wherein the battery life extending composition is a cationic organic amine of the formula $R_a$ $N^+$ where R is a straight, cyclic or branched hydrocarbon, and a is 1 to 4.

11. An apparatus for prolonging the useful life of a battery containing an electrolyte comprising:
    a battery life extending composition;
    means for refreshingly incorporating the battery life extending composition into the electrolyte in an effective amount to substantially maintain an active concentration of the battery life extending composition in the electrolyte, the means for refreshingly incorporating the battery life extending composition being a reservoir having a first tube connectable to the battery, the reservoir having a size sufficient to receive replenishment water therein, a container for receiving the battery life extending composition therein, the container having a second tube connectable to the first tube, mixing means for forming a mixture of the battery life extending composition and the replenishment water, first flow control means for adding the battery life extending composition to the replenishment water and second flow control means for periodically adding the mixture to the electrolyte.

12. The apparatus of claim 11 further comprising a filling device locatable on the battery, the battery having at least one access aperture for receiving the filling device, the filling device connectable to the mixing means for receiving the mixture therefrom, the filling device having means for automatically adding the mixture to the electrolyte and for automatically stopping the addition when a selected level has been reached.

13. A battery having one or more cells, each comprising a housing containing an electrolyte, at least one anode and at least one cathode disposed in the housing and connected respectively to separate connectors, and the respective cells connected electrically in series, the battery having means for repetitively incorporating a battery life extending composition in the electrolyte so as to substantially maintain an effective amount of the battery life extending composition in the electrolyte through the life of the battery, the means for repetitively incorporating the battery life extending composition being a separator containing the battery life extending composition therein, the separator composed of a material that is diffusible by the battery life extending composition so as to gradually release the battery life extending compound into the electrolyte.

14. The battery of claim 13 wherein the means for repetitively incorporating the battery life extending composition further comprises a housing having portions containing the battery life extending composition therein, the housing composed of a material that is diffusible by the battery life extending compound so as to gradually release the battery life extending compound into the electrolyte.

15. The battery of claim 13 wherein the means for repetitively incorporating the battery life extending composition further comprises an integral applicator that contains the battery life extending composition therein.

16. A composition for prolonging battery life comprising an organic compound containing nitrogen, and a carrier for encapsulating the compound for slow release into an electrolyte, wherein the carrier is an organic compound having 20 or more carbon atoms.

17. The composition of claim 16 wherein the organic compound containing nitrogen is an amine.

18. The composition of claim 16 wherein the organic compound containing nitrogen is a quaternary ammonium compound.

19. The composition of claim 16 wherein the organic compound containing nitrogen is a cationic organic amine of the formula $R_a N^+$ where R is a straight, cyclic or branched hydrocarbon, and a is 1 to 4.

20. The composition of claim 16 wherein the carrier is a hydrocarbon compound.

21. The composition of claim 16 wherein the carrier is a wax having 20 or more carbon atoms.

22. The composition of claim 16 wherein the composition is compacted into the form of pellets.

23. A composition for prolonging battery life comprising an organic compound containing nitrogen, and a carrier for encapsulating the compound for slow release into an electrolyte and a foaming agent.

24. A method for prolonging battery life comprising:
providing a battery containing an electrolyte therein;
providing a battery life extending composition; and
refreshingly incorporating the battery life extending composition in the electrolyte in an amount sufficient to substantially maintain an effective amount of the battery life extending composition in the electrolyte, the effective amount of the battery life extending composition being from about 1 to 5000 ppm.

25. The method of claim 24 wherein the battery life extending composition is repetitively incorporated with the electrolyte by periodically applying a sachet containing the battery life extending composition proximate to the battery and releasing the composition into the battery.

26. The method of claim 24 wherein the battery life extending composition is refreshingly incorporated into the electrolyte by providing replenishment water, adding the composition to the replenishment water to form a mixture and adding the mixture periodically to the battery.

27. The method of claim 26 further comprising adding the battery life extending composition to the replenishment water in an amount sufficient to control the growth of organisms.

28. The method of claim 27 wherein the amount is less than 800 ppm.

29. The method of claim 27 wherein the amount is about 50 to about 800 ppm.

30. The method of claim 24 wherein the battery life extending composition is refreshingly incorporated into the electrolyte by dissolving the composition with entrained mist to form a mixture and returning of the mixture to the battery electrolyte.

31. The method of claim 24 wherein the battery life extending composition is refreshingly incorporated into the electrolyte by impregnating portions of the battery with the battery life extending composition and gradual leaching of the composition therefrom into the electrolyte.

32. The method of claim 24 wherein the battery life extending composition is refreshingly incorporated into the electrolyte by encapsulating the composition in a slow release carrier and adding the encapsulated composition to the battery electrolyte.

33. The method of claim 24 wherein the battery life extending composition is refreshingly incorporated into the electrolyte by mixing the composition with a gas and periodically blowing the gas through the electrolyte.

34. The method of claim 24 wherein the effective amount of the battery life extending composition is from about 10 to 1000 ppm.

35. The method of claim 24 wherein the effective amount of the battery life extending composition is from about 20 to 850 ppm.

36. A method for prolonging battery life comprising:
providing a battery containing an electrolyte therein;
providing a battery life extending composition;
refreshingly incorporating the battery life extending composition in the electrolyte in an amount sufficient to substantially maintain an effective amount of the battery life extending composition in the electrolyte, the battery life extending composition being repetitively incorporated with the electrolyte by periodically applying a sachet containing the battery life extending composition proximate to the battery and releasing the composition into the battery.

37. The method of claim 36 further comprising adding the battery life extending composition to replenishment water for the battery in an amount sufficient to control the growth of organisms.

38. The method of claim 37 wherein the amount is less than 800 ppm.

39. A method of claim 37 wherein the amount is from about 50 to about 800 ppm.

40. The method of claim 36 wherein the effective amount of the battery life extending composition is from about 10 to 1000 ppm.

41. The method of claim 36 wherein the effective amount of the battery life extending composition is from about 20 to 850 ppm.

42. The method for prolonging battery life comprising:
providing a battery containing an electrolyte therein;
providing a battery life extending composition;
refreshingly incorporating the battery life extending composition in the electrolyte in an amount sufficient to substantially maintain an effective amount of the battery life extending composition in the electrolyte, the battery life extending composition being refreshingly incorporated into the electrolyte by providing replenishment water, adding the composition to the replenishment water to form a mixture and adding the mixture periodically to the battery.

43. The method of claim 42 further comprising adding the battery life extending composition to the replenishment water in an amount sufficient to control the growth of organisms.

44. The method of claim 43 wherein the amount is less than 800 ppm.

45. The method of claim 43 wherein the amount is from about 50 to about 800 ppm.

46. The method of claim 42 wherein the effective amount of the battery life extending composition is from about 10 to 1000 ppm.

47. The method of claim 42 wherein the effective amount of the battery life extending composition is from about 20 to 850 ppm.

48. A method for prolonging battery life comprising:
providing a battery containing an electrolyte therein;
providing a battery life extending composition;
refreshingly incorporating the battery life extending composition in the electrolyte in an amount sufficient to substantially maintain an effective amount of the battery life extending composition in the electrolyte, the battery life extending composition being refreshingly incorporated into the electrolyte by dissolving the composition with entrained mist to form a mixture and returning of the mixture to the battery electrolyte.

49. The method of claim 48 further comprising adding the battery life extending composition to replenishment water for the battery in an amount sufficient to control the growth of organisms.

50. The method of claim 49 wherein the amount is less than 800 ppm.

51. The method of claim 49 wherein the amount is from about 50 to about 800 ppm.

52. The method of claim 49 wherein the effective amount of the battery life extending composition is from about 10 to 1000 ppm.

53. The method of claim 49 wherein the effective amount of the battery life extending composition is from about 20 to 850 ppm.

54. A method for prolonging battery life comprising:
providing a battery containing an electrolyte therein;
providing a battery life extending composition;
refreshingly incorporating the battery life extending composition in the electrolyte in an amount sufficient to substantially maintain an effective amount of the battery life extending composition in the electrolyte, by mixing the composition with a gas and periodically blowing the gas through the electrolyte.

55. The method of claim 54 further comprising adding the battery life extending composition to replenishment water for the battery in an amount sufficient to control the growth of organisms.

56. The method of claim 55 wherein the amount is less than 800 ppm.

57. The method of claim 55 wherein the amount is from about 50 to about 800 ppm.

58. The method of claim 54 wherein the effective amount of the battery life extending composition is from about 10 to 1000 ppm.

59. The method of claim 54 wherein the effective amount of the battery life extending composition is from about 20 to 850 ppm.

60. A composition for prolonging battery life comprising an organic compound containing nitrogen and having dissolution limiting means having 20 or more carbon atoms for slow release of the compound into an electrolyte.

* * * * *

UNITED STATES PATENT AND TRADEMARK OFFICE
CERTIFICATE OF CORRECTION

PATENT NO.    : 6,635,387 B2
DATED         : October 21, 2003
INVENTOR(S)   : Johan C. Fitter et al.

It is certified that error appears in the above-identified patent and that said Letters Patent is hereby corrected as shown below:

Column 17,
Line 59, after "a", insert -- size sufficient to receive the battery life extending composition and replenishment water therein --

Column 20,
Line 55, "A method" should read -- The method --
Line 63, "The method" should read -- A method --

Signed and Sealed this

Thirteenth Day of January, 2004

JON W. DUDAS
*Acting Director of the United States Patent and Trademark Office*